United States Patent [19]

Poland

[11] Patent Number: 5,034,598
[45] Date of Patent: Jul. 23, 1991

[54] KEYBOARD EMULATION SYSTEM PROVIDING AUDIBLE FEEDBACK WITHOUT A BUILT-IN TRANSDUCER

[75] Inventor: McKee D. Poland, Portola Valley, Calif.

[73] Assignee: Hewlett-Packard Company, Palo Alto, Calif.

[21] Appl. No.: 458,955

[22] Filed: Dec. 29, 1989

[51] Int. Cl.⁵ .................. G06K 7/00; H03K 17/94; G06F 7/00; G09G 3/02

[52] U.S. Cl. ................................ 235/435; 235/439; 235/462; 340/707; 341/13; 341/26; 341/27; 341/31; 364/237.85

[58] Field of Search ............... 235/419, 472, 462, 439, 235/472; 340/502, 707; 341/13, 14, 20, 26, 27, 31; 364/709.01, 709.02, 709.06, 709.09, 709.11, 237.85

[56] References Cited

U.S. PATENT DOCUMENTS

| | | | |
|---|---|---|---|
| 4,418,277 | 11/1983 | Tremmel et al. | 235/419 |
| 4,423,319 | 12/1983 | Jacobsen | 235/419 |
| 4,470,038 | 9/1984 | Amano et al. | 341/26 |
| 4,481,412 | 11/1984 | Fields | 235/419 |
| 4,761,544 | 8/1988 | Poland | 235/472 |
| 4,804,949 | 2/1989 | Faulkerson | 235/472 |
| 4,825,058 | 4/1989 | Poland | 235/472 |
| 4,861,972 | 8/1989 | Elliott et al. | 364/709.11 |
| 4,864,302 | 9/1989 | Bowers | 235/462 |
| 4,894,522 | 1/1990 | Elliot | 235/462 |
| 4,920,488 | 4/1990 | Filley | 235/385 |
| 4,937,778 | 6/1990 | Wolf et al. | 341/26 |

*Primary Examiner*—Stuart S. Levy
*Assistant Examiner*—Edward H. Sikorski

[57] ABSTRACT

The system unit of an IBM compatible personal computer generates a distinctive audible "Beep" signal from the system unit's own sound transducer in response to the successful decode of a barcode label in a keyboard emulation data collection device such as a barcode reader. To initiate the generation of such a Beep by the system unit, the keyboard emulation system simulates a benign error condition which does not affect the operation of any application programs resident in the system unit and which does not require any modifications to the operating system or any special device drivers for its proper operation. The successful collection of encoded character data and transmission of that data to the keyboard port of a host computer by a relatively unsophisticated operator is further enhanced by built-in logic for reliably and simply deducing which keyboard communication protocol from several candidates is currently in use and for deducing the status of the computer's Caps Lock flag by eliciting a Reset Status Indicators command from the system unit. If the Caps Lock flag is in its shifted state, all case sensitive data is automatically transposed so that it will be correctly interpreted.

33 Claims, 6 Drawing Sheets

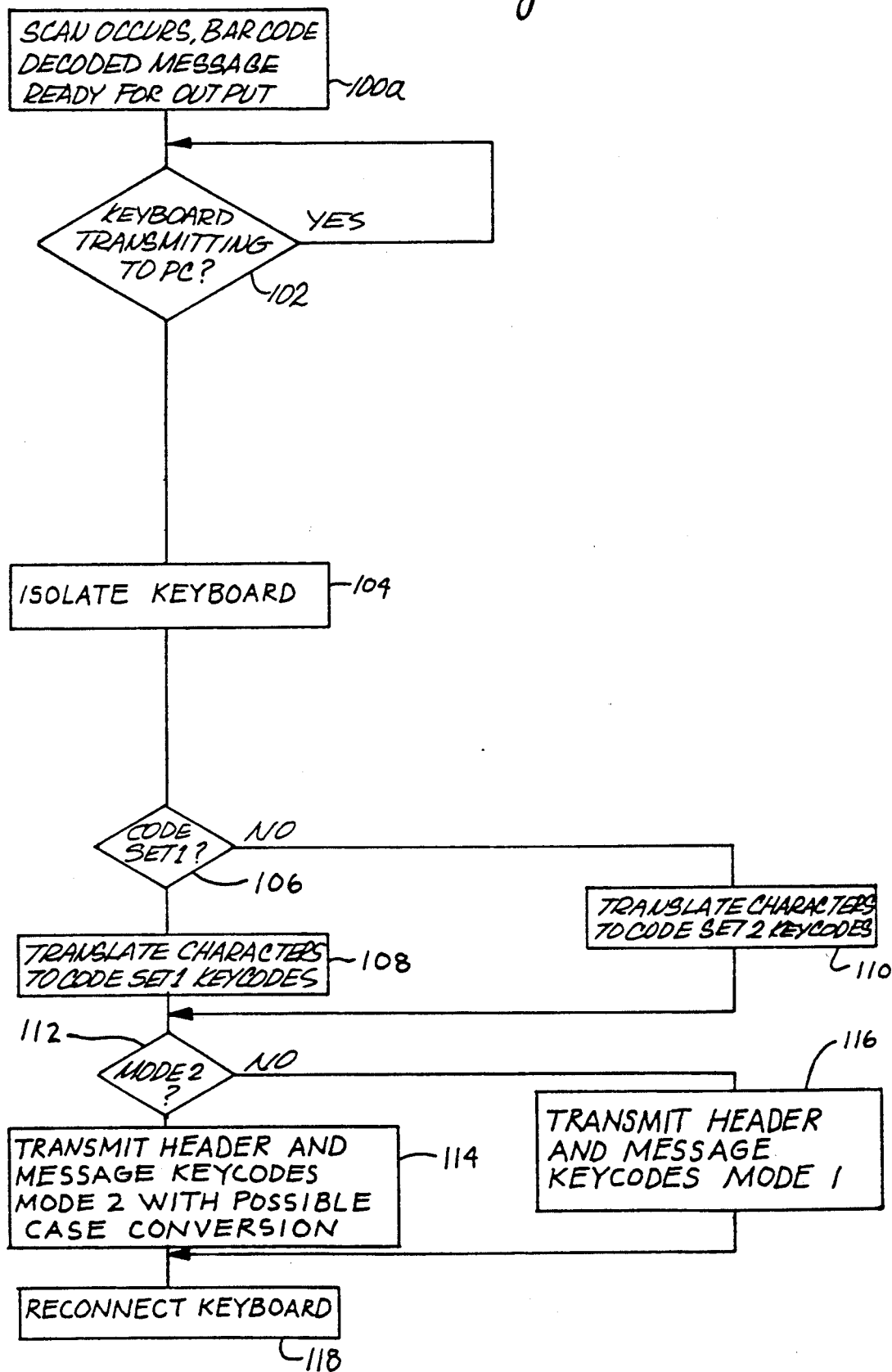

KEYBOARD EMULATION SYSTEM PROVIDING AUDIBLE FEEDBACK WITHOUT A BUILT-IN TRANSDUCER

FIELD OF INVENTION

The present invention relates to a keyboard emulator type of data collection device, and more particularly to improvements in the operator interface thereof whereby the operator is assured of the successful collection of encoded character data and transmission of that data to the keyboard port of a host computer even if the operator is not viewing the decoded data as it is processed by the computer.

BACKGROUND OF THE INVENTION

A keyboard is an example of a manual data collection device for a computer system. Typically, an operator depresses keys similar to those of a typewriter or an adding machine, and the individual keystrokes are sequentially converted by built-in switches and logic circuitry within the keyboard unit into a sequence of keyscan codes, each corresponding to the actuation of a key on the keyboard. The sequence of keyscan codes is thereafter converted into a corresponding sequence of alphanumeric (e.g., A-Z, a-z, 0-9), symbol (e.g., !, @, #, $, %) and/or function (e.g., [enter], [backspace], etc) character codes. A commonly used set of such character codes is the 7-bit ASCII (American Standard Code for Information Interchange) code, which also exists in various "extended" 8-bit versions.

In many small computer systems, including the ubiquitous "IBM-compatible personal computer", a keyboard unit transmits keyscan codes to a system unit via a keyboard port, and the system unit converts the keyscan codes to character codes which serve as input data to various user-oriented applications programs. Two sets of such keyscan codes are in common use, a "Code 1" code set typically associated with the original IBM PC and characterized by only 10 function keys and an integrated numeric/cursor keypad, and a "Code 2" code set associated with the IBM AT and characterized by 12 function keys and dedicated cursor keys.

In such a system, a programmed microprocessor inside the keyboard unit performs a number of functions, including self-test, scans the individual keys to determine their respective states, generates a keyscan code each time one of the keys changes state ("make" or "break"), stores up to 16 keyscan codes in a buffer, and transfers each keyscan code from the buffer to the system unit in accordance with a defined hand-shake protocol. Two such IBM compatible protocols are in common use, which will be referred to herein as "Mode 1" (typically associated with the IBM PC XT) and "Mode 2" (typically associated with the IBM PC AT and the IBM PS/2).

The system unit's operating system software and hardware, typically including Basic Input Output System (BIOS) firmware provided by the computer manufacturer, then converts the keyscan code signal appearing at the keyboard port into a corresponding sequence of character codes and/or status flags in a form usable by the application programs. In particular, a keyboard I/O driver (or a special purpose driver included as part of a particular application program) handles the "handshake" protocol used to transfer keyscan data from the keyboard unit to the computer, defines which keys are given the attributes of typematic, shift, toggle, and/or control, and updates one or more shift state flags used to process the next incoming keyscan code. The actual code and protocol used will depend on the type of computer: The most common types of keyboards are the 84 key keyboard typically used with the IBM PC XT (Code 1) and the "enhanced" 101/102 key keyboard typically associated with the IBM PC AT (Code 2). These two computer types are normally associated respectively with the two aforementioned protocols (Mode 1 and Mode 2); however, as exemplified by certain of the IBM PS/2 personal computers, it is also possible to use a Code 1 code set with a Mode 2 protocol, although most PS/2 models use the Mode 2/Code 2 combination. (In fact, the IBM PS/2 system units are typically programmed to accommodate both the Code 1 and the Code 2 keyscan code sets, as well with a third keyscan code set, known as "Code 3").

When using such an arrangement of keyboard unit and system unit, the operator may press and release the keys faster than the corresponding keyscan codes can be read (and processed into character codes) by the system unit. If the rate at which keyscan codes are entered into the keyboard buffer exceeds the rate at which the keyscan codes are removed from the buffer for transmission, the result will be a "keyboard buffer overflow" condition, which is signified to the system unit of IBM compatible computers by a special keyscan code. The system unit BIOS reacts to this special keyscan code by executing a "Beep" routine, which activates a small loudspeaker or other sound transducer inside the system unit, and thus provides the operator with an audible warning. A similar situation will also be true for the keyboards connected not directly to a system unit, but rather to a terminal connected to a remote host computer, in which case either the remote computer or built in logic within the terminal will detect a benign keyboard error condition and cause a sound transducer inside the terminal to generate a distinctive Beep. It should be noted that the keyboard buffer overflow condition is "benign" in the sense that it has no adverse influence on the operation of the computer system unit (or computer terminal), and the normal operation of the computer continues, but accompanied by an audible signal which alerts the operator to a possible corruption of input data from the keyboard.

Other data collection devices usable with computer systems and computer terminals include contact barcode readers, non-contact (e.g. laser) barcode readers, magnetic stripe readers, electrical multimeters, OCR scanners, and electronic weighing scales.

To accommodate these other types of data input devices (as well as variety of other input and output devices) a small computer typically is also provided with a serial port and the necessary software and hardware to read and write ASCII data to and from the serial port.

A keyboard emulation device may be defined as a data collection device which transmits data to a computer as keyscan codes through the computer's keyboard I/O port, but which obtains the data from a source other than actuation of physical keys on a keyboard unit by an operator. It translates the data it collects into a format acceptable to the computer operating system and transmits the data through the keyboard port according to the standard protocol for the keyboard I/O channel.

Application software created for use with manual keyboard input will thus also work with a keyboard emulator type of data collection device without any modifications to either the application program or the computer operating system. The keyboard emulator can complement or replace the keyboard unit for a given application, allowing efficient data entry. Normally, the keyboard emulator physically connects between the existing keyboard unit and computer, allowing the keyboard unit to remain active in the system, but inserting its own data into the I/O channel when data collection occurs, which may be termed a "T-connector" Mode. A "Keyboard Replacement" Mode is also possible, wherein the keyboard emulator is the only device connected to a particular keyboard port and takes over responsibility for all functions at that port. A particularly important category of keyboard emulation devices, at least from a commercial point of view, are devices which may be plugged directly into the keyboard port of an "IBM-PC compatible" personal computer without any modifications to the system unit or to any of software used therewith.

Regardless of whether the data originates from a keyboard, from a keyboard emulation device, or from another type of data collection device, it is preferable to provide the operator with visual and/or audible feedback. One example of such feedback is the display of the characters on the computer's video monitor as they are being input from the keyboard. In addition, keyboard units are frequently provided with mechanical or electrical means to generate an audible "click" each time a key is depressed, which provides an audible form of operator feedback. In the case of ASCII data which is input via a serial port, appropriate operator feedback is sometimes provided by means of a special software driver or application program that produces the desired feedback when it detects transmission of ASCII data.

Although the ASCII character set includes a "Bell" character (ASCII $007_{10}$) which typically causes the MS-DOS operating system to generate a Beep (using the computer's built-in sound transducer) if echoed to the display device, many software programs either ignore the Bell character or treat it as just another displayable symbol (♪ or ^ G). Using a special driver or application program with a keyboard emulation device is especially undesirable because it defeats its primary advantage, which is software transparency. Rather than relying on special application programs and/or device drivers (with their attendant potential incompatibility problems) to properly interpret a special control character as audible feedback, it has thus become common to provide data collection devices (other than keyboards) with a dedicated sound transducer to provide audible feedback each time the input device is activated by the operator and completes a successful operation (such as reading a barcode or other machine readable data compatible with the device). In the case of a data collection device that is intended for use with the serial port of the system unit, this may be accomplished by means of an optional module between the data collection device and the computer's serial input, which is designed to monitor the data line from the input device and produces an audible tone whenever data is being transmitted.

Prior art keyboard emulation systems often employed a sound transducer to provide audible feedback to the user or operator in the form of a beeper module. The beeper module was designed as an integral part of the keyboard emulation system; however, it added cost and bulk to the system, resulted in a product that was inconvenient to hold and/or utilized a separate chassis for the electronics (which was less desirable from an ergonomic point of view), and, since openings in the system package are needed to allow the sound to escape efficiently, compromised the mechanical integrity and sealing of the keyboard emulation system.

When inputting data both from the keyboard and from the data collection device using barcode data in accordance with a symbology (such as Code 128) that has distinct representations for upper and lower case alphabets, it is necessary to verify that any "Caps Lock" key on the associated keyboard had not been left in its "on" state before data was transmitted by the keyboard emulator to the computer. The operator could accomplish this by visually examining a "Caps Lock" indicator on the keyboard or computer screen or by visually examining the input data as displayed on the computer screen. Alternatively, some data collection devices were able to compensate for a set shift state flag automatically, presumably by monitoring all transmissions from the keyboard for Caps Lock and/or Shift keyscan codes, from which it would then be possible to deduce the current state of the shift state flag; however, such an "open loop" solution was inherently unreliable and interfered with the optimal utilization of the emulator's processing capacity.

SUMMARY OF THE INVENTION

A presently preferred embodiment of the invention consists of a method and related apparatus for scanning a barcode symbol into a legal sequence of bars and spaces that may be decoded into a valid sequence of character codes and transmitted as a sequence of keyscan codes in such a way that the keyscan code sequence will be properly decoded by the computer back into the same valid sequence of character codes represented by the originally scanned barcode symbol, without requiring the operator to visually examine the data as it is processed by the computer.

In accordance with a first aspect of the invention, the computer's system unit generates a distinctive audible signal from the system unit's own sound transducer in response to the successful decode of a barcode label in a keyboard emulation barcode reader. To initiate the generation of such a Beep by the system unit, the keyboard emulation system simulates an error condition which does not affect the operation of any application programs and which does not require any modifications to the operating system or any special device drivers for its proper operation.

In the particular case of IBM-compatible personal computers, there are typically two special keyscan codes for indicating a benign error condition that will initiate the generation of the desired Beep, but not otherwise interfere with the computer's normal processing of data: 00H and FFH (the H signifies a number in hexadecimal notation). These particular keyscan codes do not actually correspond to keys on the IBM keyboard, but may signify one of two keyboard errors to BIOS: the overflow of the keyboard unit's internal buffer or a key detection error. Standard versions of BIOS respond by simply discarding the error keyscan code and generating a Beep, and thus the error is "benign" in so far as it has no effect on the normal operation of the computer or on any application program. The sound of such a Beep and the firmware and hardware actually used to generate it may vary amongst models of PC's, but, by the very definition of "IBM compatible" the action taken by the computer's BIOS is consistent. The keyboard emulator system thus is able to provide the operator with an audible confirmation of a successful data collection operation by merely simulating an error in the input process to which the system responds by sounding a Beep to alert the operator to an input error condition that normally would require operator attention. Moreover, since the system unit already includes the necessary sound transducer hardware and firmware to alert the operator in the event such an error occurs, a keyboard emulator system constructed in accordance with the teachings of the present invention no longer needs its own dedicated sound transducer and associated drivers to provide the operator with audible confirmation of a successful read; for the great majority of application programs, this is accomplished regardless of what application programs are actually running and without any modification to the system unit or any of its operating system software.

In one particular embodiment, the keyboard emulator is adapted to interpret specially encoded bar codes printed in a standard symbology such as Code 128, such that sequences of characters within the symbology are mapped to keyscan codes, including the above-mentioned error keyscan code. Since the decoded information is transmitted to the system unit only if it has been successfully read and decoded, it is merely necessary to add the particular keyscan code signifying a keyboard error on the label which will be scanned by the data entry device in order to provide the operator with audible confirmation each time the label is successfully read during a subsequent data collection operation.

In another embodiment having more general applicability, the keyboard emulator system assembles the successfully collected data into a message which additionally incorporates the special keyscan code, for example, in a header that is attached at the beginning of each transmission of data to the system unit. In this case, no special decoding and conversion of barcode data to keyscan codes is necessary. The special keyscan code is merely appended as the decoded barcode ASCII characters are converted to a stream of keyscan codes.

In accordance with a second but related aspect of the invention, when used with an IBM PC AT or other IBM Mode 2 compatible system unit, the keyboard emulator uses the IBM compatible Mode 2 protocol "Reset Status Indicators" command to obtain current keyboard status information maintained by the system unit, including the state of the Caps Lock flag, so that if necessary that flag may be reset to a predetermined "off" state prior to transmitting any keyscan codes; alternatively the keyscan codes may be "preshifted" before transmission. As a result, there is no need for the operator to visually verify that the character data from the keyboard emulator have not been inadvertently shifted by the computer's operating system before being made available to any resident application program.

Preferably, the keyboard emulator includes means for automatically detecting when a particular keyboard communication protocol is in use (for example Mode 2 protocol used by the IBM PC AT and IBM PS/2), and, unless a specific protocol has been preconfigured by the user, uses that information to establish how the scan data is to be translated and transmitted to the computer and/or if and how to determine the current keyboard status information maintained by the computer.

BRIEF DESCRIPTION OF THE DRAWINGS

These and other features and advantages of the present invention will be appreciated as the same becomes better understood by reference to the following detailed description when considered in connection the accompanying drawings, wherein:

FIGS. 5A and 5B respectively are flow diagrams of the operation of the communication module following a successful or unsuccessful scan attempt by the barcode reader.

DETAILED DESCRIPTION

Figure 1:
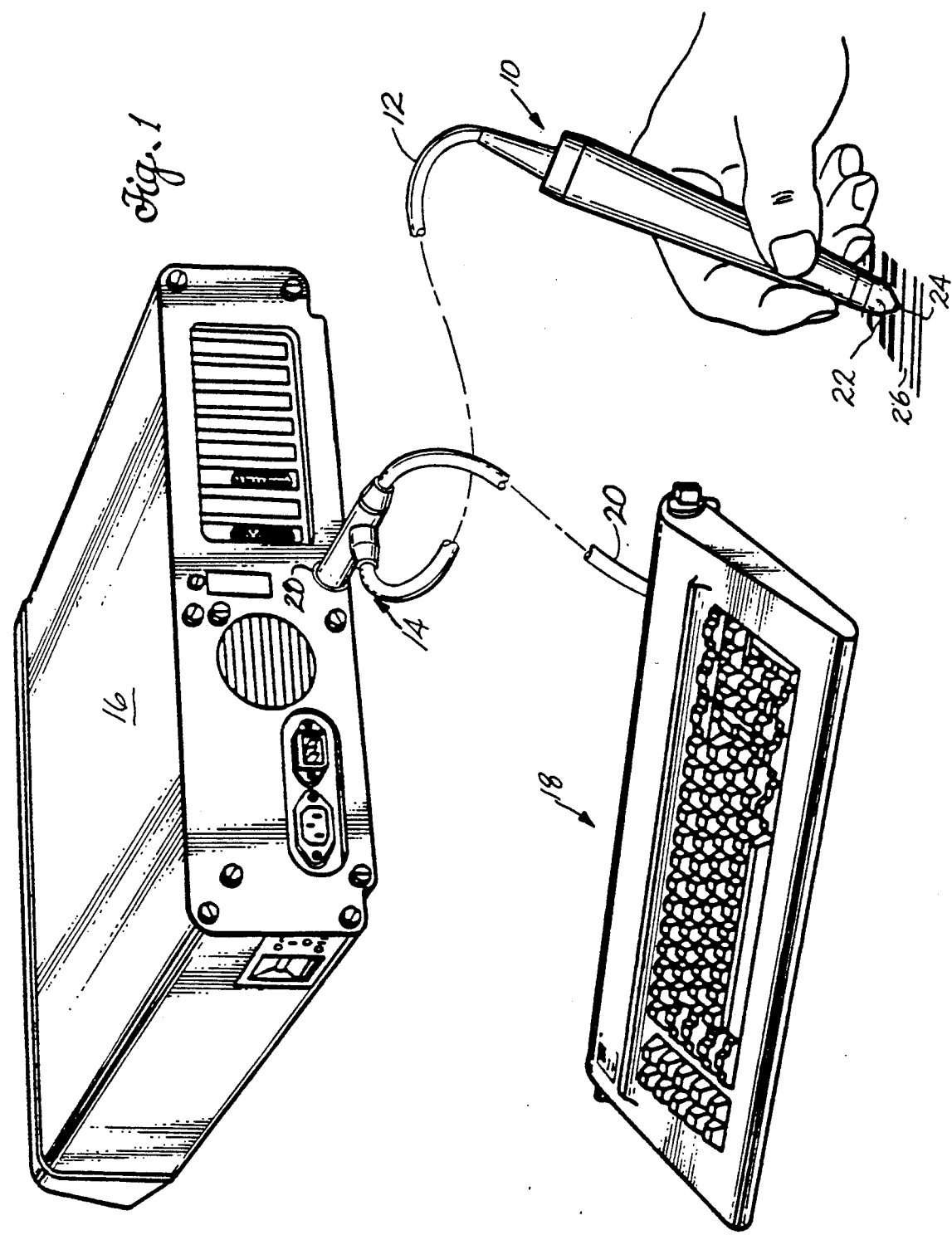
FIG. 1 shows a presently preferred embodiment of the invention in actual use with a barcode reader as its data collection device.

FIG. 1 shows a presently preferred embodiment of the invention in the form of a wand shaped self-contained barcode scanning unit 10 which has a cable 12 terminated by a T-connector 14 for interfacing the wand with the computer's system unit 16 and its keyboard unit 18 via cable 20.

The wand 10 preferably is about 160 mm long and about 23 mm in diameter, and is shaped so as to be conveniently held in one hand of an operator. At the end 22 remote from the cable 12, there is provided a transparent window 24 which is slid across the label 26 bearing the code which is to be read. The wand 10 transmits data to the computer's system unit 16 only after a barcode 26 has been scanned, and provides an otherwise transparent interface between the computer's keyboard and system units. The aforementioned Keyboard Replacement mode is a possible alternate for the T-Connector mode shown in FIG. 1; in that case no keyboard unit 18 is plugged into the T-connector 14 and only the wand 10 is thus connected to the keyboard port 28 of the system unit 16.

Figure 2:
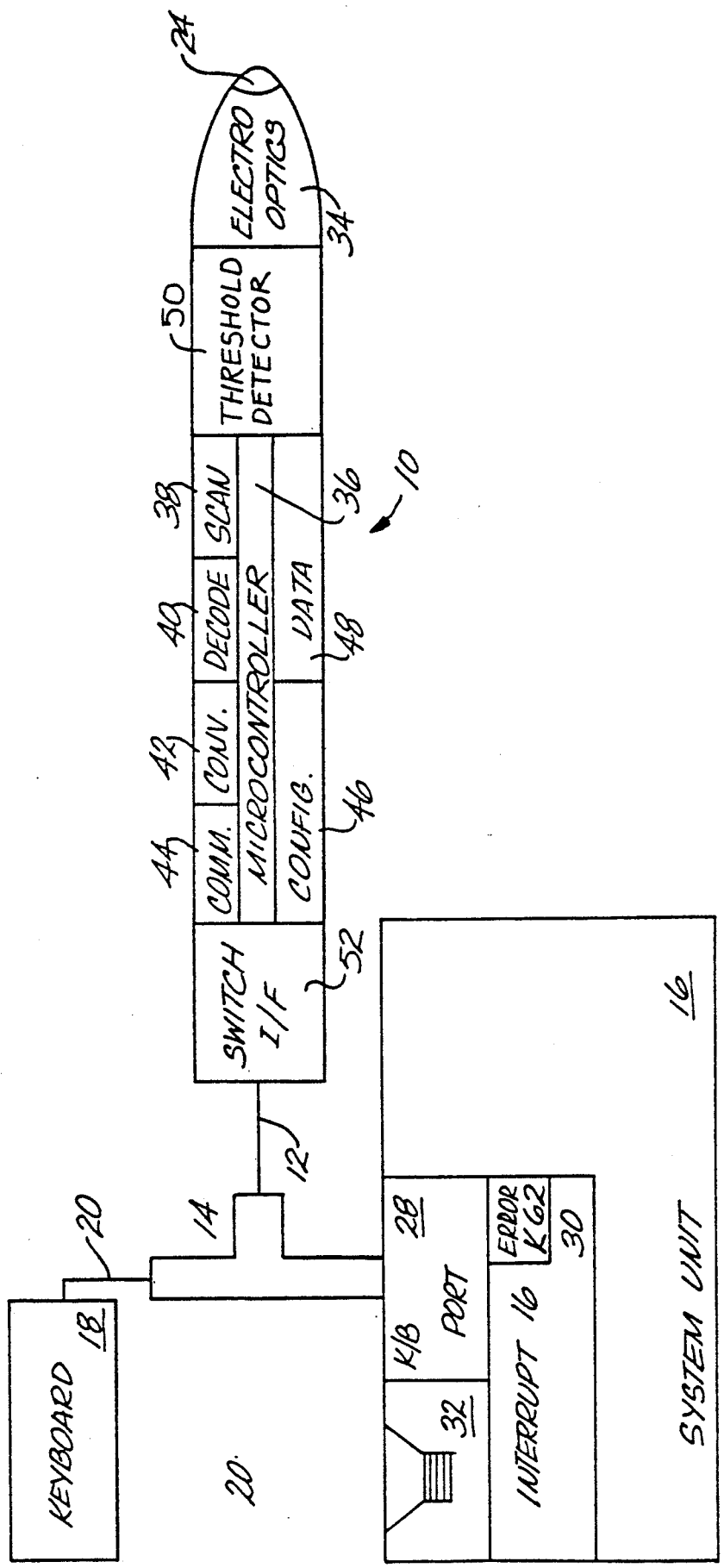
FIG. 2 is a block diagram of the major components shown in FIG. 1.

Referring to FIG. 2, which is a block diagram of the major components shown in FIG. 1, it should be noted that the keyboard unit 18 is unchanged from what is conventionally used with the a typical small computer such as an IBM PC-compatible personal computer and the keyboard unit is thus represented in simple block form. The same is true for the computer system unit 16; however, a keyscan conversion means (BIOS keyboard interrupt service routine 30) and a keyboard buffer overflow means (for example, error entry point K62 and associated loudspeaker or other sound transducer 32) have been separately shown, since the functional and structural relationship of these otherwise conventional components with the various components internal to the keyboard emulation system 10 is an important aspect of the invention.

The wand 10 is a derivative of a barcode reader sold by Hewlett Packard under the trademark SmartWand and documented in various Hewlett Packard publications, including the "HP SmartWand Programmable Contact Bar Code Reader Technical Data Sheet" dated January 1988 and the "HP SmartWand Users Manual for HBCR-8XXX Series" dated July 1987. Wand 10 comprises a conventional optoelectronic sensor head 34 which may used to scan various types of barcodes, including Code 39, Extended Code 39, Interleaved 2 of 5, UPC/EAN/JAN, Codabar, Code 128, Code 11, and MSI Code. The wand 10 also comprises an Intel 8051 family (or equivalent) microcontroller 36 operating under the control of a time interval acquisition module 38, a number of decoding modules 40, a code-converting module 42, and an initialization/communication module 44. The various modules are in the form of firmware fixed in a ROM; non-volatile memory 46 is used to store configuration data; a temporary store 48 is also provided for the data being processed by the above mentioned modules.

The digital microcontroller 36 is interfaced to the optoelectronic sensor head 34 via a conventional threshold detector circuit 50; microcontroller 36 is also interfaced to the signals present on cable 12 and T-connector 14 via an appropriate switchable electrical interface 52, as will be described in more detail hereinafter with respect to FIG. 3. Moreover, the above mentioned electronic and electro-optical components and subsystems inside the wand 10 all draw their power from the system unit 16 via the cable 12 and the T-connector 14.

Figure 3:
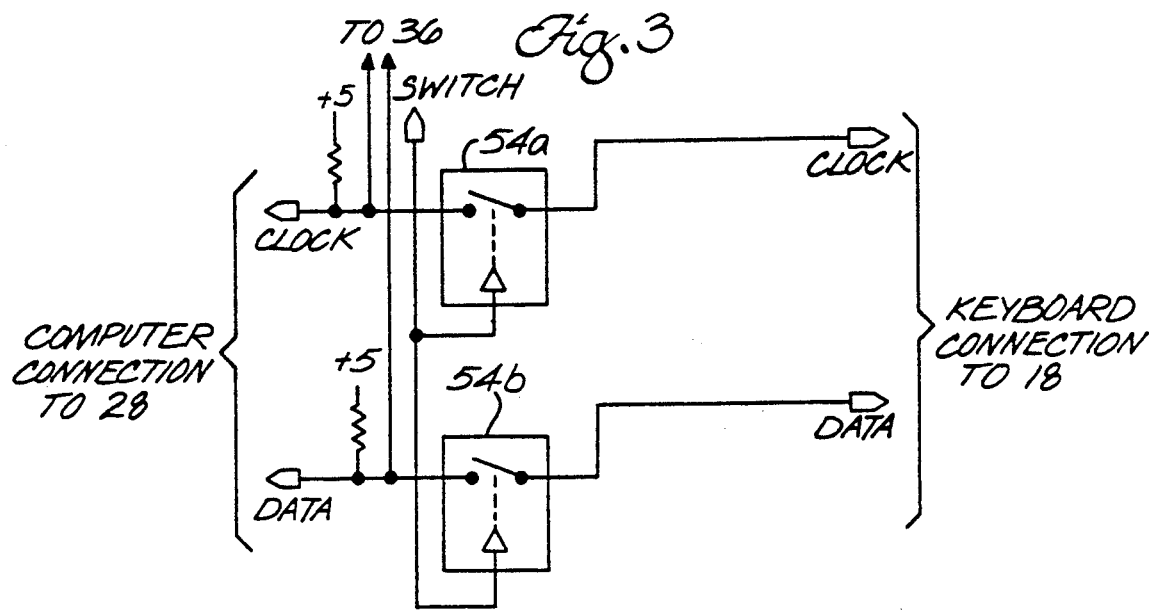
FIG. 3 is a circuit diagram of the switching circuitry for temporarily isolating the communications module shown in block form in FIG. 2 from any attached keyboard.

Referring to FIG. 3, it may be seen that the switching interface circuitry 52 between the microcontroller 36 and the T-connector 14 comprises a pair of analog switches 54a, 54b which are driven by a common control signal SWITCH. When SWITCH is high, the two switches 54a and 54b are closed and the CLOCK and DATA lines from the keyboard port 28 and from the microcontroller 36 are directly connected to the keyboard unit 18; conversely, when SWITCH is low, the keyboard 18 is isolated from the system unit 16 and the microcontroller 36. For some applications, it may be desirable to not only isolate the keyboard 18 from the system unit 16 during transmission of data from the microcontroller 36, but also to prevent any possible loss of data from the keyboard 18 while it is thus isolated. This may be accomplished by suitable manipulation of the DATA and or CLOCK lines leading to the keyboard while switches 54a, 54b are open.

The wand 10 including its optoelectronic sensor head 34 and its scanning and decoding modules 38, 40 are substantially identical to corresponding elements of the above-referenced SmartWand device, as further documented in commonly assigned U.S. Pat. No. 4,761,544 entitled "Means and Method of Scaling Time Interval Measurements from an Optical Bar Code Scanner to Improve Decoder Efficiency". The following discussion will assume the reader is familiar with the construction and use of that prior art device and, to the extent the present invention preferably makes use of components and techniques already known from the referenced prior art device, such components and techniques will not be described in detail herein.

Furthermore, it will be assumed that the reader is familiar with the Mode 1 (used in models PC and PC XT) and Mode 2 (used in models AT and PS/2) keyboard unit to system unit interface protocols and the associated keyboard I/O BIOS routines documented by IBM in its various Technical Reference manuals, including (for the Code 1/Mode 1 interface) IBM publication 6025005, version 2.02 dated April 1983 (for the Mode 2 interface the corresponding IBM publication number is 1502494).

Wand 10 transmits keyscan codes and uses a computer to keyboard protocol so that it may interface directly to its system unit 16 via the computer's keyboard port 28; the referenced prior art device outputs ASCII character codes and utilizes a standard serial protocol and thus must be connected to a general-purpose serial I/O port (not shown). Accordingly, it differs from that particular prior art device primarily in the construction and operation of its code converting module 42 and its communication module 4 and related interface circuitry 52.

Preferably, wand 10 can be configured for attachment either to an IBM PC (Code 1, Mode 1) or to IBM PC AT (Code 2, Mode 2) or to IBM PS/2 (Codes 1, 2, or 3; Mode 2) keyboard port, and can also be configured to share the port with the keyboard unit, or to operate without any keyboard unit. Because of the small size of the wand, it is not convenient to provide it with manual configuration switches or buttons; however, manual configuration is still possible by the same Barcode Menu Programming technique used in the above-referenced SmartWand device. Alternatively, by monitoring the commands from the computer at power on and the responses from the keyboard unit, the wand can usually determine which protocol (Mode) and which keyscan code set (Code) is in use, thereby permitting the microprocessor inside the wand to select the configuration setting. However, it is still advisable to retain a manual configuration option to enable the keyboard emulator to be used even with a computer system unit and/or a keyboard unit that is not 100% compatible with one of the above mentioned types.

From the perspective of the system unit 16, the wand 10, like the keyboard unit which it emulates, preferably is a "talk-only" peripheral that primarily transmits keyscan codes. Accordingly, with the exception of some communication protocol options transparent to the user (such as a RESET command which clears the wand of any previously scanned input data that has not yet been transmitted to the system unit 16), the wand 10 is not capable of being configured by commands sent from the system unit 16. Instead, it can be configured by scanning one or more appropriate option barcodes from a barcode configuration menu similar to those contained in the above referenced SmartWand publication. These option barcodes control such parameters as barcode symbology selection, check sum verification, and length checking. Since wand 10 is a keyboard emulation device, the options also may include the keyscan code set (Codes 1, 2 or 3), and the keyboard I/O protocol (Mode 1 or Mode 2), and whether a keyboard unit 18 is also attached to the port 28 via a T-connector 14 (T-connector mode or Keyboard Replacement mode). Configuration options are preferably saved in non-volatile memory 46 in the wand 10. The only I/O configuration normally required of the use in installing the wand 10 is to select Keyboard Replacement Mode or T-connector Mode, depending on whether a keyboard unit is to be used in the system.

Figure 4:
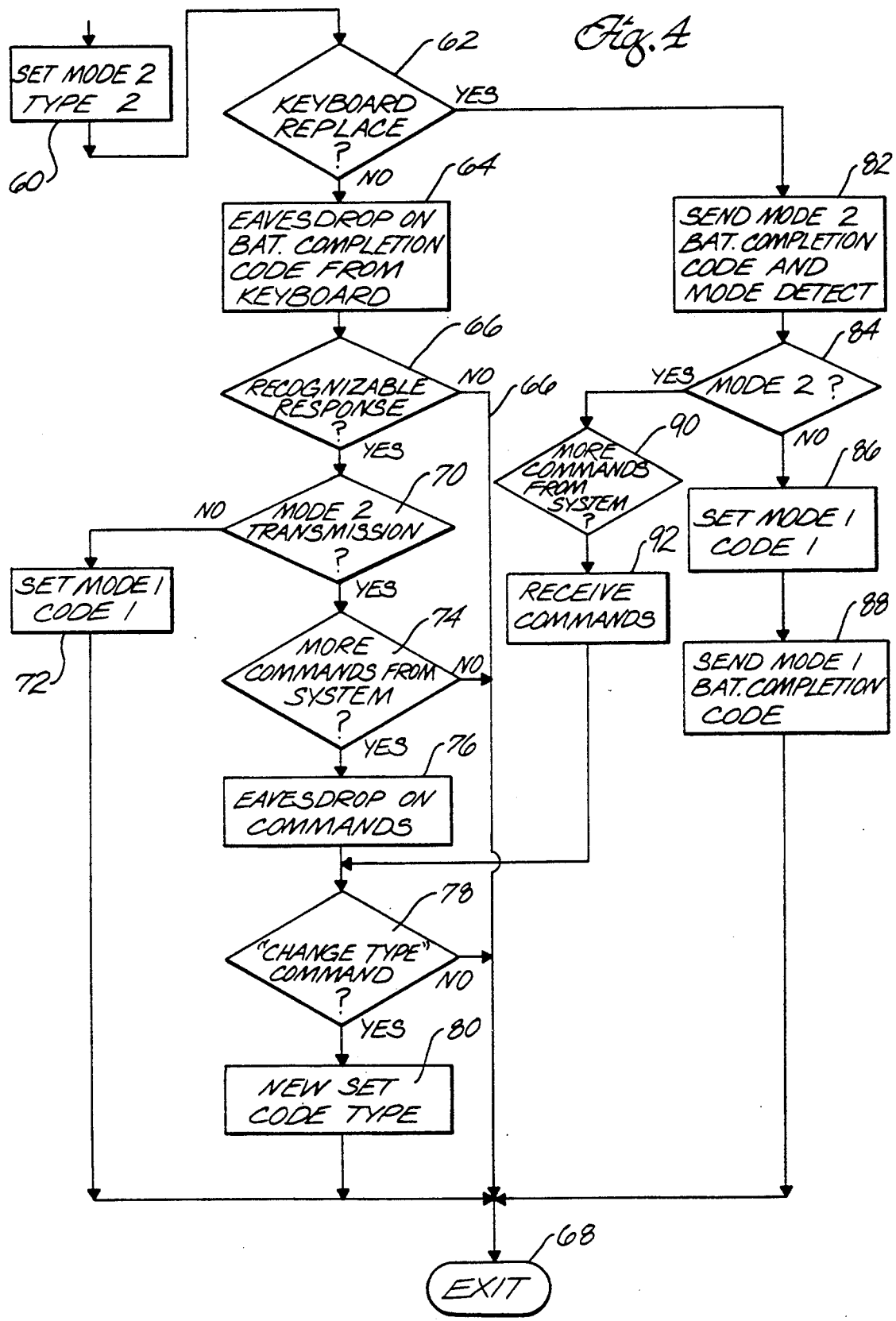
FIG. 4 is a flow diagram of the operation of the communication module during initialization.

In the preferred embodiment, the communication module 44 can determine at power-up the keyscan code set and protocol mode automatically, obviating the explicit configuration of the parameters by the operator. Referring to the power-up detection subroutine of FIG. 4, communication module 44 initially assumes Mode 2, Code 2, at power-up (block 60). If the wand 10 is set to its default T-connector mode ("No" branch from decision block 62), it monitors ("eavesdrops" on) the signals between the system unit 16 and the keyboard unit 18 to detect and analyze the transmission of the Basic Assurance Test ("BAT") Completion signal from the keyboard unit 18 (block 64). If the transmission is not recognizable as a BAT ("No" branch from decision block 66), the power-up routine of FIG. 4 ends the automatic detection process, remaining set to Mode 2, Code 2 (exit 68). If the transmission is recognizable ("Yes" branch from decision block 66), it is checked (decision block 70) for conformity to Mode 1 or Mode 2 protocol. If it was a Mode 1 transmission ("No" branch from decision block 70), the routine sets Mode 1, Code 1 (block 72) and exits (exit 68). If it was a Mode 2 transmission ("Yes" branch from decision block 70), then the original Mode setting is valid, and the routine proceeds to check for more commands from system unit 16 (decision block 74). If none are received during the remainder of the power-up time period ("No" branch from decision block 74), the routine exits (exit 68). If, however, more commands are transmitted from the system unit 16 to the keyboard 18 ("Yes" branch from decision block 74), the routine eavesdrops on the commands (block 76); if a "Change Type" command is detected ("Yes" branch from decision block 78), the default Code 2 is changed to the indicated Code (block 80); otherwise the subroutine is exited (exit 68) with the Code 2 default setting ("No" branch from decision block 78).

Alternatively, if the wand 10 has been set to Keyboard Replacement mode ("Yes" branch from decision block 62), the communication module 44 sends a Mode 2 BAT Completion code (block 82). If an appropriate response is not received from the system unit 16 within a preset timeout period ("No" branch from decision block 84), the communication module changes the default setting to Mode 1, Code 1 (block 86) and transmits a Mode 1 BAT Completion code (block 88) before exiting (exit 68); otherwise, it waits for any additional system command (decision block 90) and after any such system command has been received and acknowledged (block 92), control passes to decision block 78 for possible resetting of the default Code (blocks 78, 80).

The optoelectronic sensor head 34 feeds analog signals to threshold detector 50, which in turn includes analog processing circuitry for generating a digital pulse stream which switches between "high" and "low" states at transitions between light and dark areas as the wand scans the barcode area; the scanning module 38 then converts that incoming pulse stream into numeric data corresponding to the number and relative width of each space and bar in the code, and one or more decoding modules 40 then use predetermined rules associated with particular codes to attempt to decode the symbolic data into character data and related control data (which typically includes checksum information). These rules and any associated checksum information are also used by the associated decoding module to verify whether the bar data constitutes a legal message and thus the barcode data from a particular scanning operation has been successfully read and decoded.

Although the wand 10 is normally programmed to attempt to decode a single set of symbolic data corresponding to one pass of the wand 10 over a particular barcode label 26 by successive passes through different decoding modules 40 until the information has been successfully decoded, the decoding operation is also subject to user configuration by means of the above-mentioned Barcode Menu Programming. The specific means to achieve such flexibility is already known in the prior art as exemplified by the above referenced SmartWand device.

IBM-PC compatible keyboard emulator data collection devices that read various types of barcodes and translate them into sequences of IBM-PC compatible keyscan codes are also known per se. However, the design of the code-converting module 42 that converts the decoded sequence of character data into a corresponding sequence of keyscan codes should be routine and conventional to one familiar with the above-referenced IBM documents, even if he were not familiar with how such a conversion were accomplished in the prior art. Thus, to emulate an IBM PC keyboard unit, the conversion module 42 first converts the already decoded barcode data into the corresponding keystrokes that a human would need to perform in order to create the same data input manually, taking into account the manner in which the [shift] keys (and also the [alt] and [control] keys) may be used in combination with the regular alphanumeric keys to represent a single character. For example, when using an IBM PC compatible keyboard, the ∧ Z control character ("end of file" marker) is output manually by first depressing the [control] key, then depressing the "Z" key, then releasing the "Z" key, then releasing the [control] key; similarly, the "<" symbol character is output by first depressing either one of the two [shift] keys, then depressing the "," key, then releasing the "," key, then releasing the [shift] key. The previously determined information as to the keyboard type and a corresponding a priori translation table may then be used by the conversion module 42 to translate those keystrokes into their respective keyscan codes—the single or multiple bytes of data that represent the make (pressing) and break (releasing) of individual keys. The resultant sequence of keyscan codes form the actual message that is transmitted to the keyboard port by the communication module 44; in accordance with the previously determined Mode 1 or Mode 2 IBM PC-compatible two line serial protocol for the clock and data lines of cable 12.

Some prior data collection devices, including the SmartWand deVice, had only very limited operator feedback capabilities, and required optional hardware and/or modifications to the user's application software in order to provide the operator with an appropriate audible confirmation whenever a barcode label had been successfully scanned and decoded. In the case of a keyboard emulator, the collected data is typically treated by the computer's operating system and application software as normal keyboard data and thus is usually displayed on the computer's video monitor by the application software to permit editing and/or confirmation as the data is entered from the keyboard. However, depending upon the application software, such visual feedback may be altogether missing (e.g., for user passwords and other sensitive data) or, if it is followed by other data or an "enter" command, may disappear from the screen before it is ever seen by the operator. Even when the data being input is visible on a video monitor, it may be inconvenient for the operator to check it visually during the data entry process. Accordingly, the known prior art keyboard emulators included a sound transducer and associated driver electronics within the emulator or its associated controller. Whenever a keyscan was successfully encoded, the prior art keyboard emulator's control logic would drive the transducer with a distinctive audible frequency signal.

In a keyboard emulator system constructed in accordance with the present invention, dependable, consistent audible feedback is provided without any additional sound transducer or associated driver electronics within the emulator or its associated controller. Rather, the emulator, at least in its default configuration, always includes one or more special keyscan codes as part of each sequence of keyscan codes corresponding to a successfully decoded barcode message that the BIOS firmware within the computer's system unit interprets as a temporary "keyboard buffer overflow" or other benign error condition. In response thereto, the standard BIOS keyboard interrupt service routine 30 passes temporary control to a Beep subroutine K62 which causes an audible signal to be output the computer's own built in transducer 32. Immediately thereafter, the system unit 16 continues to process any further incoming keyscan data. By this means, reliable audible feedback is ensured without any modifications to, or disruption of, the normal operation of the computer and any application or system software then in operation.

At the same time, an extremely compact, self-contained data collection device is possible.

Figure 5B:
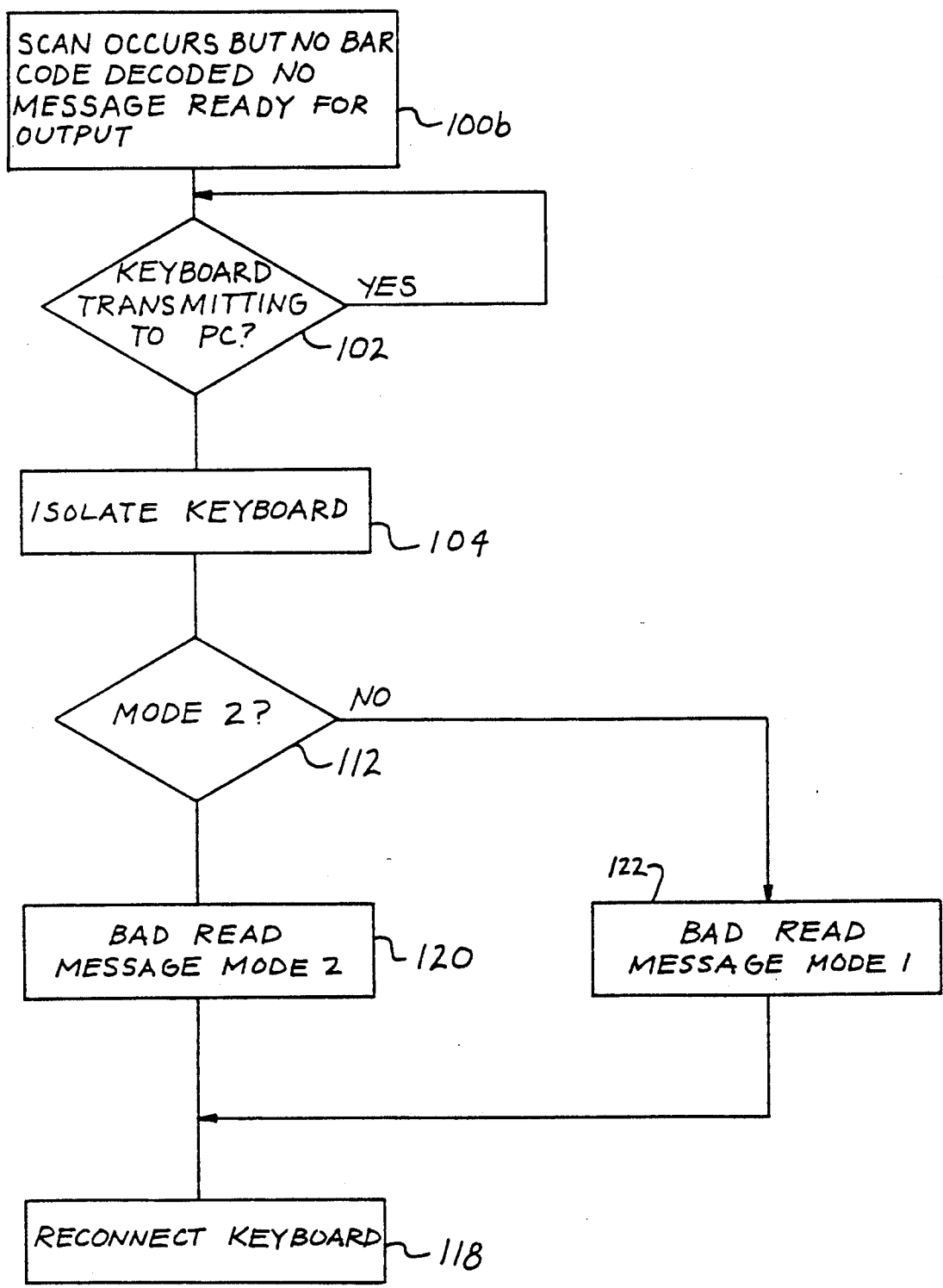

Reference should now be made to FIGS. 5A and 5B, which respectively are block diagrams of the operation of the communication module 44 following a successful or unsuccessful scan attempt. After a barcode has been scanned and decoded (blocks 100a, 100b), the communication module waits (block 102) for the end of any ongoing transmission from the keyboard. It then, by opening analog switches 54a, 54b, isolates the keyboard (block 104). Note, however, that in Mode 2, the wand 10 should respond to any commands from the system unit while the keyboard unit is isolated, by sending at least the Acknowledge code and, if the command is relevant to the operation of the wand 10, by executing that command.

What follows depends upon whether the scanning and decoding modules 38, 40 were able to successfully scan and decode a sequence of barcode data that had the proper checksum and otherwise appeared to be the result of a successful scan operation (FIG. 5A or 5B). If the decoding was successful (FIG. 5A), the characters are translated (block 108 or 110) to keyscan codes using the appropriate code set (block 106). Then, using the appropriate protocol (block 112) a "header message" followed by the translated characters are transmitted (block 114 or 116) in a contiguous block of keyscan codes using the appropriate transmission protocol as though the user had typed this same data from a keyboard at an average rate of approximately 20 milliseconds per character. (This rate is preferably configurable by the user). For use with an IBM PC XT having a Code 1 board and a Mode 1 keyboard protocol, a preferred default configuration for the header message comprises a single FFH code, which is interpreted as a benign keyboard error by the system unit 16 and results in a single Beep from the system unit's speaker 32. (For other types of computers, the preferred default configuration may be a single 00H code). Finally, the connection between the keyboard unit 18 and the system unit 16 (which was temporarily broken in block 104) is reestablished (block 118) by closing analog switches 54a, 54b (FIG. 3). Although a header message containing a benign error code is used in the illustrated embodiment, it should be understood that the benign error code could be within the body of message itself, or in a message trailer; for some types of computers it might even be possible to emulate a benign error condition by violating the keyboard communication protocol, for example by transmitting an inappropriate response (or no response at all) to a command from the system unit.

In the event scanning and decoding modules 38, 40 detected the occurrence of a scan that could not be successfully decoded (which could be the result either of operator error, or a defective barcode label), the alternate flow shown in FIG. 5B occurs, in which a "Bad Read Message" (which in the wand's default configuration comprises two successive FFH keyscan codes) is transmitted (blocks 120, 122), resulting in a double Beep that may easily be distinguished from the single Beep signifying a good scan.

In addition to the configurable options that pertain to transmission mode and code set, it may also be advantageous to implement as user configurable options two parameters for the transmission of keyscan codes to the PC. The keyscan code delay is the delay between the transmission of each keyscan code: 2 milliseconds is typical value and is faster than most humans can perform at the keyboard unit. A minimum hold-off period is desirable before any transmission from the wand 10: 20 milliseconds is a typical value sufficient for most applications.

As described above, in order to create an audible tone to signify the completion of a successful barcode scan (the "good read" Beep ), in its default configuration the wand 10 uses the special keyscan code FFH to cause the system unit 16 itself to generate a Beep. Alternatively, a representation of this keyscan code can be encoded in a standard barcode symbology such as Code 128 using a specially interpreted character sequence. When interpreted by the decoder along with regular ASCII characters of the bar code, the Beep keyscan code is then placed in the transmitted keyscan code stream along with the keyscan codes for the regular characters of the bar code message. Multiple copies of the Beep keyscan code can be printed in a single barcode, allowing varied durations and groupings of Beeps to be generated in response to different barcodes. Varied audio feedback can be created in this manner to respond to special conditions encountered or created by barcode scanning, such as in response to configuration of the wand 10 by means of barcode menus.

When the keyscan code FFH is used as the first character in the header, it causes the system unit to generate a Beep immediately after the keyscan is completed, before the barcode data is completely transmitted. Alternatively, the special FFH keyscan code can be configured as part of trailer, or both the header and the trailer. Preferably the header and trailer are configurable, with one or more keyscan codes being read into designated buffer areas using special barcode menu labels.

As noted previously, two special keyscan codes can be used to create a Beep, 00H and FFH. Neither actually corresponds to any key on the IBM keyboard; rather they signify one of two possible keyboard errors to BIOS: the overflow of the keyboard units's internal buffer or a key detection error. The FFH keyscan code is recognized both by an IBM PC XT and by an IBM PC AT; it is accordingly used for the Beep by default, but the 00H keyscan code may need to be configured by the user for some models of PC AT compatibles in order for BIOS to respond with an audible beep. Alternatively, the communications module 44 might be programmed to normally use the FFH code, but to automatically switch to the 00H code when a Mode 2 protocol is in use. Typically, an IBM PC-compatible system BIOS will discard either of those particular keyscan codes and thus the transmission of such an error code to the system unit has no adverse effect on its operating system or on any application program that might then be resident.

In the particular, but commercially important case of an IBM PC compatible keyboard, the Caps Lock key acts as a toggle switch which when activated causes any alphabetic characters to be converted with system unit 16 from lower to upper case, or vice versa. This Caps Lock function is implemented in the BIOS of the system unit, not in the keyboard. When toggled to its "On" state, the Caps Lock function effectively reverses the normal operation of the two "Shift" keys. Each time the Caps Lock key is pressed, the keyboard sends the corresponding key codes to the system unit 16, and the system unit toggles its own Caps Lock flag, keeping track of the Caps Lock state internally.

As a result, unless appropriate measures were taken, a sequence of keyscan codes corresponding to the bar code message:

*1 Code 128 Message* would, if the Caps Lock flag had previously been set, be interpreted by the system unit as:

*1 cODE 128 mESSAGE*

This could be undesirable in any application program whose data entry section is sensitive to case. The user would have to be aware of the problem and take care that Caps Lock was in the proper state while scanning bar code.

In theory, it might be sufficient for the communications module to monitor all transmissions from the keyboard to the system unit following a reset command, and each time a keyscan code corresponding the actuation of the Caps Lock key is detected, toggle an internal flag corresponding to the Caps Lock status flag maintained by the system unit. In practice, this requires a microcontroller having a bandwidth (processing rate) substantially greater than that of the Intel 8051 microcontroller. In addition, since monitoring transmissions of the Caps Lock keyscan codes would only allow the microcontroller to detect toggles in state of the computer's Caps Lock status flag, the microcontroller would have to make a correct assumption at power up about the initial state of the computer's status flag. The initial state; however, is not necessarily the same for all IBM PC "compatibles". Further, synchronization between the status flags in the system unit 16 and the microcontroller 36 might subsequently be lost as the result of incomplete or otherwise erroneous transmission from the keyboard.

Figure 6:
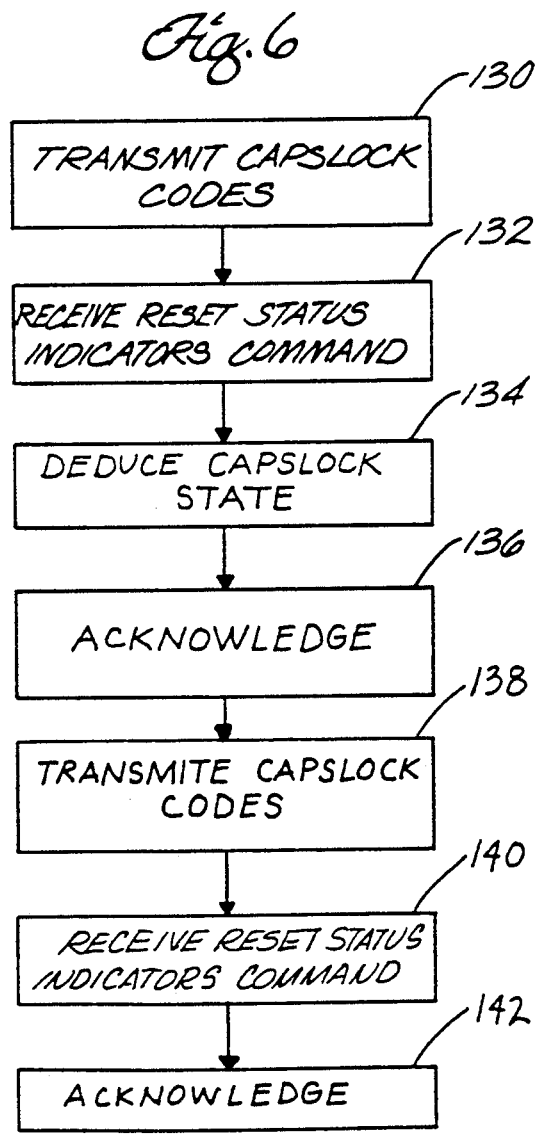
FIG. 6 is a flow diagram of the emulation of upper and lower case characters when using a Mode 2 keyboard protocol.

However, at least for Mode 2, a much simpler solution exists, as shown in FIG. 6. When the wand 10 is ready to send data, it first isolates the keyboard (block 104 of FIGS. 5A and 5B). It then transmits the Caps Lock make and break keyscan codes (block 130) to the system unit 16, which in turn immediately responds by sending back the Reset Status Indicators command (block 132), followed by the new status indicators byte (normally used to control any corresponding status indicators on the keyboard). The communication module 44 interprets the received status indicator byte and deduces the state of the Caps Lock flag (block 134) as it was immediately prior to the transmission of the Caps Lock keyscan make and break codes (block 130). After acknowledging the Reset Status Indicators command as required by the Mode 2 protocol (block 136), the communication module 44 then sends the Caps Lock key codes again (block 138) to toggle the state of Caps Lock in the system unit 16 back to the untoggled original state. Thereupon, it receives the Reset Status Indicators command again (block 140), and Acknowledges it again (block 142). The communication module 44 then transmits the keyscan codes of the decoded message, performing case conversion if necessary (block 114, FIG. 5A). At the end of the transmission, the connection between keyboard 18 and the system unit 16 is reestablished (block 118 of FIG. 5A or 5B). The keyboard 18 is completely unaffected by the foregoing sequence of commands and keyscan codes because it is isolated during the entire transaction, and the system unit 16 is left in the original Caps Lock state.

What is claimed is:

1. For use with a computer system unit or computer terminal unit comprising a keyboard port and a sound transducer and utilizing a predetermined keyboard communication protocol for inputting data from a keyboard unit via the keyboard port as a sequence of keyscan codes, the protocol including provision for signifying at least one predetermined benign error condition within the keyboard unit which causes an audible error signal to be generated by said sound transducer, a keyboard emulator comprising:

input means for converting a machine-readable symbol into a digital representation of a message comprising one or more character codes;

output means responsive to the input means for:

a) translating said character codes into keyscan codes;

b) emulating said predetermined benign error condition by including at least one special error code with said keyscan codes whenever said input means successfully translates said machine-readable symbol into a corresponding sequence of character codes, said special error code having no effect on the processing of said keyscan codes by the computer when said keyscan codes are transmitted to said keyboard port; and c) transmitting said keyscan codes and special error code to said keyboard port in accordance with said keyboard communication protocol, whereby whenever the input means converts a machine-readable symbol and corresponding keyscan codes and special error code are transmitted to the keyboard port of the computer from the output means, the computer will produce an audible error signal.

2. The keyboard emulator of claim 1 wherein
said keyboard emulator is an elongated contact-type barcode reader which does not contain any sound transducer.

3. The keyboard emulator of claim 1 wherein
said benign error condition is emulated by transmitting a predetermined keyscan code to said system or terminal unit, and
said system or terminal unit is programmed to cause said sound transducer to generate an audible error signal whenever said predetermined keyscan code is received at said keyboard port.

4. The keyboard emulator of claim 3 wherein said computer is an IBM PC compatible computer which in its standard configuration generates an audible "Beep" in response to a keyscan code of "FFH" and said benign error condition is signified by at least one such "FFH" keyscan code.

5. The keyboard emulator of claim 3 wherein said computer is an IBM PC compatible computer which in its standard configuration generates an audible "Beep" in response to a keyscan code of "00H" and said benign error condition is signified by at least one such "00H" keyscan code.

6. The keyboard emulator of claim 3 wherein
said machine-readable symbol includes a portion which is converted and translated into said predetermined keyscan code.

7. The keyboard emulator of claim 6 wherein
said symbol is encoded as one or more characters of a Code 128 barcode and said portion is preceded and followed by a predetermined Code 128 function code.

8. The keyboard emulator of claim 6 wherein
said keyboard emulator is an elongated wand which does not contain any sound transducers, and
said computer system or terminal unit contains an internal sound transducer means programmed to generate an audible "Beep" in response to said predetermined keyscan code.

9. The keyboard emulator of claim 1 further comprising
status means responsive to a status command from the computer for deducing status of a shift state status flag, and
transposing means responsive to the deducing means and the input means for transposing shift states of predetermined keyboard characters prior to encoding by the output means whenever said shift state status flag is in an activated state.

10. The keyboard emulator of claim 9 wherein the keyboard is a Mode 2 IBM compatible keyboard, the system unit or terminal unit is an IBM AT or PS/2 compatible system unit,
the status means transmits a predetermined status change keyscan code prior to each transmission of a decoded and converted message to the computer, and
said status command is a Reset Status Indicators command transmitted by the system unit to the keyboard unit in response to said predetermined status change keyscan code.

11. The keyboard emulator of claim 10 wherein
said predetermined keyboard keys are alphabetic keys, and
said predetermined status change keyscan code is a Caps Lock keyscan code.

12. The keyboard emulator of claim 11 wherein
the status means transmits a second said Caps Lock keyscan code subsequent to each said transmission to return the shift state status flag to its state prior to said transmission.

13. The keyboard emulator of claim 1, further comprising:
verification means for verifying whether the message is a legal message;
header means for generating a "good read" message header comprising at least one predetermined keyscan code signifying said benign error condition; and
communication means responsive to the verification means and the header means for transmitting the legal message header and the keyscan codes corresponding to the legal message to the keyboard port in accordance with the predetermined keyboard communication protocol.

14. The keyboard emulator of claim 13 wherein
said verification means further comprises misread detector means for detecting a "no-read" condition signifying that the machine readable symbol being processed by the input means could not be converted into a legal message and
said communication means transmits a "no-read" message in response thereto.

15. The keyboard emulator of claim 14 wherein
said "no-read" message comprises at least two said predetermined keyscan codes, and
said "good read" message header and said "no-read" message cause the computer to produce different respective audible responses.

16. The keyboard emulator of claim 13 wherein said computer is an IBM PC compatible computer which in its standard configuration generates an audible "Beep" in response to a keyscan code of "FFH" and said benign error condition is signified by at least one such "FFH" keyscan code.

17. The keyboard emulator of claim 13 wherein said computer is an IBM PC compatible computer which in its standard configuration generates an audible "Beep" in response to a keyscan code of "00H" and said benign error condition is signified by at least one such "00H" keyscan code.

18. The keyboard emulator of claim 13 further comprising
mode means for determining whether said keyboard communication protocol is a particular predetermined protocol.

19. The keyboard emulator of claim 18 wherein said header means and said communication means are responsive to said mode means.

20. The keyboard emulator of claim 18 wherein
said particular predetermined protocol is an IBM compatible Mode 2 protocol,
said emulator is being used as a replacement for said keyboard unit, and
said mode means further comprises
sending means for causing the emulator to send a Mode 2 Basic Assurance Test Completion code and
deducing means for determining whether the system unit's response to the Mode 2 Basic Assurance Test Completion code is in accordance with said IBM compatible Mode 2 protocol.

21. The keyboard emulator of claim 18 wherein
said particular predetermined protocol is an IBM compatible Mode 2 protocol,
said emulator is being used concurrently with said keyboard unit, and
said mode means further comprises
monitoring means for causing the emulator to eavesdrop on transmissions between the keyboard unit and the system unit until a Basic Assurance Test Completion code is detected and
deducing means for determining whether the Basic Assurance Test Completion code is in accordance with said IBM compatible Mode 2 protocol.

22. The keyboard emulator of claim 13 further comprising
status means responsive to a status command from the computer for deducing status of a shift state status flag, and transposing means responsive to the deducing means and the input means for transposing shift states of predetermined keyboard characters prior to encoding by the output means whenever said shift state status flag is in an activated state.

23. The keyboard emulator of claim 22 wherein
the keyboard is a Mode 2 IBM compatible keyboard,
the system unit or terminal unit is an IBM AT or PS/2 compatible system unit,
the status means transmits a predetermined status change keyscan code prior to each transmission of a decoded and converted message to the computer, and
said status command is a Reset Status Indicators command transmitted by the system unit to the keyboard unit in response to said predetermined status change keyscan code.

24. The keyboard emulator of claim 23 wherein
said predetermined keyboard keys are alphabetic keys, and
said predetermined status change keyscan code is a Caps Lock keyscan code.

25. The keyboard emulator of claim 24 wherein
the status means transmits a second said Caps Lock keyscan code subsequent to each said transmission to return the shift state status flag to its state prior to said transmission.

26. The keyboard emulator of claim 1 further comprising mode means for determining whether said keyboard communication protocol is a particular predetermined protocol.

27. The keyboard emulator of claim 26 wherein said particular predetermined protocol is an IBM compatible Mode 2 protocol;
said emulator is being used as a replacement for said keyboard unit, and
said mode mans further comprises
sending means for causing the emulator to send a Mode 2 Basic Assurance Test Completion code and
deducing means for determining whether the system unit's response to eh Mode 2 Basic Assurance Test Completion code is in accordance with said IBM compatible Mode 2 protocol.

28. The keyboard emulator of claim 26 wherein said particular predetermined protocol is an IBM compatible Mode 2 protocol,
said emulator is being used concurrently with said keyboard unit, and
said mode mans further comprises
monitoring means for causing the emulator to eavesdrop on transmissions between the keyboard unit and the system unit until a Basic Assurance Test Completion code is detected and
deducing means for determining whether the Basic Assurance Test Completion code is in accordance with said IBM compatible Mode 2 protocol.

29. For use with a computer system unit or computer terminal comprising a keyboard port and utilizing an IBM compatible Mode 2 keyboard communication protocol for inputting data from a keyboard unit via the keyboard port as a sequence of keyscan codes, a keyboard emulator comprising:
input means for converting a machine-readable symbol into a digital representation of a message comprising one or more character codes;
output means responsive to the input means for transmitting said message to said keyboard port in accordance with said keyboard communication protocol as a corresponding sequence of keyscan codes;
status means for
transmitting a predetermined status change keyscan code prior to each transmission of a decoded and converted message, and
for deducing status of a shift state status flag from a Reset Status Indicators command transmitted to the keyboard unit in response to said predetermined status change keyscan code; and
transposing means responsive to the deducing means and the input means for transposing shift states of predetermined keyboard characters prior to encoding by the output means whenever said shift state status flag is in an activated state.

30. The keyboard emulator of claim 29 wherein
said predetermined keyboard keys are alphabetic keys, and
said predetermined status change keyscan code is a Caps Lock keyscan code.

31. The keyboard emulator of claim 30 wherein
the status means transmits a second said Caps Lock keyscan code subsequent to each said transmission to return the shift state status flag to its state prior to said transmission.

32. The keyboard emulator of claim 29 wherein
said particular predetermined protocol is an IBM compatible Mode 2 protocol,
said emulator is being used as a replacement for said keyboard unit, and
said emulator further comprises
sending means for causing the emulator to send a Mode 2 Basic Assurance Test Completion code and
mode means for determining whether the system unit's response to the Mode 2 Basic Assurance Test Completion code is in accordance with said IBM compatible Mode 2 protocol.

33. The keyboard emulator of claim 29 wherein
said particular predetermined protocol is an IBM compatible Mode 2 protocol,
said emulator is being used concurrently with said keyboard unit, and
said emulator further comprises
monitoring means for causing the emulator to eavesdrop on transmissions between the keyboard unit and the system unit until a Basic Assurance Test completion code is detected and
mode means for determining whether the Basic Assurance Test Completion code is in accordance with said IBM compatible Mode 2 protocol.

* * * * *